(12) United States Patent
Jedlinski et al.

(10) Patent No.: US 12,128,336 B2
(45) Date of Patent: Oct. 29, 2024

(54) FUEL FILTER ASSEMBLY

(71) Applicant: Hamilton Sundstrand Corporation, Charlotte, NC (US)

(72) Inventors: Marek Jedlinski, Wilczyce (PL); Marcin Korczynski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/210,692

(22) Filed: Mar. 24, 2021

(65) Prior Publication Data

US 2021/0299597 A1 Sep. 30, 2021

(30) Foreign Application Priority Data

Mar. 30, 2020 (PL) .......................................... 433387

(51) Int. Cl.
*B01D 35/147* (2006.01)
*B01D 29/35* (2006.01)
(Continued)

(52) U.S. Cl.
CPC ......... *B01D 35/1475* (2013.01); *B01D 29/35* (2013.01); *B01D 35/1573* (2013.01);
(Continued)

(58) Field of Classification Search
CPC ................ B01D 35/1475; B01D 29/35; B01D 35/1573; B01D 35/30; B01D 2201/167;
(Continued)

(56) References Cited

U.S. PATENT DOCUMENTS 3,235,085 A 2/1966 Humbert, Jr.
4,053,410 A 10/1977 Lorimor
(Continued)

FOREIGN PATENT DOCUMENTS

DE 10315052 A1 12/2003
DE 102013223352 A1 5/2015
(Continued)

OTHER PUBLICATIONS

English Machine Translation of DE102018221261A1 (Year: 2020).*
(Continued)

*Primary Examiner* — Madeline Gonzalez
(74) *Attorney, Agent, or Firm* — CANTOR COLBURN LLP

(57) ABSTRACT

A fuel filter is provided which comprises a manifold, a connector element, a filter bowl, a filter element, an inlet shutoff valve, an outlet shutoff valve, an inlet port, an inlet passage, an outlet port, an outlet passage and a relief valve in which the connector element is fixed to the manifold, and the filter bowl is reversibly fixed to the connector element. The filter bowl is adapted to reversibly receive the filter element and is so configured that when the filter element is located within the filter bowl and the filter bowl attached to the connection element the filter element divides the space defined by the connector element and filter bowl into an inlet filter chamber and an outlet filter chamber. The inlet port mouths through a surface of the manifold, and the inlet port and inlet filter chamber are in fluid communication via the inlet passage.

13 Claims, 8 Drawing Sheets

SECTION A-A

(51) Int. Cl.
  *B01D 35/157* (2006.01)
  *B01D 35/30* (2006.01)
  *F02M 37/48* (2019.01)

(52) U.S. Cl.
  CPC ............ *B01D 35/30* (2013.01); *F02M 37/48* (2019.01); *B01D 2201/167* (2013.01); *B01D 2201/302* (2013.01); *B01D 2201/304* (2013.01)

(58) Field of Classification Search
  CPC ........ B01D 2201/302; B01D 2201/304; B01D 2201/291; B01D 2201/303; B01D 35/153; F02M 37/48; F02M 37/36; F02M 37/42; F02M 37/32
  USPC ....... 210/767, 130, 136, 235, 282, 440–443, 210/455, 457, 437, DIG. 17
  See application file for complete search history.

(56) References Cited

U.S. PATENT DOCUMENTS

| | | | |
|---|---|---|---|
| 4,127,484 A | 11/1978 | Walulik et al. | |
| 4,512,884 A | 4/1985 | Wheatley | |
| 4,617,116 A | 10/1986 | Seiler | |
| 4,818,397 A | 4/1989 | Joy | |
| 4,876,857 A | 10/1989 | Feltz et al. | |
| 4,885,082 A | 12/1989 | Cantoni | |
| 5,560,824 A * | 10/1996 | Sann | B01D 29/96 210/450 |
| 5,881,699 A | 3/1999 | Brown et al. | |
| 6,068,762 A | 5/2000 | Stone et al. | |
| 6,068,763 A * | 5/2000 | Goddard | B01D 35/147 210/DIG. 17 |
| 6,555,000 B2 | 4/2003 | Knight | |
| 7,029,575 B1 | 4/2006 | Baumann et al. | |
| 7,744,758 B2 * | 6/2010 | Dworatzek | B01D 27/144 210/136 |
| 8,316,880 B2 | 11/2012 | Grosskopf et al. | |
| 9,180,390 B2 | 11/2015 | John | |
| 9,453,462 B2 | 9/2016 | Rickis | |
| 10,024,239 B2 | 7/2018 | Turcotte | |
| 10,357,728 B2 | 7/2019 | Ardes | |
| 2001/0004061 A1 | 6/2001 | Popoff et al. | |
| 2003/0127384 A1 | 7/2003 | Kapur | |
| 2005/0252847 A1 | 11/2005 | Urbahn et al. | |
| 2015/0128906 A1 | 5/2015 | Futa et al. | |
| 2020/0325863 A1 | 10/2020 | Roesgen et al. | |
| 2021/0299598 A1 | 9/2021 | Jedlinski et al. | |
| 2021/0299599 A1 | 9/2021 | Jedlinski et al. | |
| 2021/0332779 A1 | 10/2021 | Jedlinski et al. | |
| 2022/0193581 A1 | 6/2022 | Jedlinski et al. | |

FOREIGN PATENT DOCUMENTS

| | | | |
|---|---|---|---|
| DE | 102018221261 A1 | 6/2020 | |
| EP | 0117617 B1 | 3/1988 | |
| EP | 1350551 B1 | 5/2006 | |
| EP | 3907396 A1 | 11/2021 | |
| FR | 2979387 A1 | 3/2013 | |
| IT | MI20111315 A1 | 1/2013 | |

OTHER PUBLICATIONS

Extended European Search Report for EP Application No. 21163233.6, dated Oct. 8, 2021, pp. 1-5.
Extended European Search Report for EP Application No. 21163267.4, dated Oct. 8, 2021, pp. 1-5.
Extended European Search Report for EP Application No. 21163346.6, dated Oct. 8, 2021, pp. 1-5.
Extended European Search Report for International Application No. 21163218.7 dated Sep. 23, 2021, 5 pages.
Non Final Office Action for U.S. Appl. No. 17/210,711, dated Aug. 29, 2022, 21 pages.
Non Final Office Action for U.S. Appl. No. 17/210,721, dated May 12, 2022, 15 pages.
Non Final Office Action for U.S. Appl. No. 17/239,843, dated Sep. 27, 2022, 24 pages.
Abstract for DE102013223352 (A1), Published: May 21, 2015, 1 page.
Abstract for DE102018221261 (A1), Published: Jun. 10, 2020, 1 page.
EP Office Action for EP Application No. 21163218.7, dated Oct. 4, 2022, pp. 1-4.
European Search Report for application EP 20461598.3, dated Mar. 26, 2021, 10 pages.
Notice of Allowance for U.S. Appl. No. 17/210,711, mailed Dec. 21, 2022, 10 pages.
Notice of Allowance for U.S. Appl. No. 17/210,721, mailed Dec. 14, 2022, 13 pages.
Notice of Allowance for U.S. Appl. No. 17/239,843, mailed Feb. 16, 2023, 19 pages.
Non Final Office Action for U.S. Appl. No. 17/210,711, Mailed Apr. 7, 2023, 45 pages.
U.S. Final Office Action for U.S. Appl. No. 17/210,711, mailed Aug. 16, 2023, 11 pages.
Non Final Office Action for U.S. Appl. No. 17/554,866, mailed Apr. 22, 2024, 34 pages.

* cited by examiner

FUEL FILTER ASSEMBLY

FOREIGN PRIORITY

This application claims priority to Polish Application No. P.433387 filed Mar. 30, 2020, the entire contents of which is incorporated herein by reference.

TECHNICAL FIELD

This disclosure relates to fuel filters and in particular to fuel filters having a filter bypass valve and shutoff valves on the fuel inlet and outlets.

BACKGROUND

Known fuel filters comprise a filter bowl suitable for housing a filter element, a filter element, and a manifold to which the filter bowl may be reversibly attached. The manifold includes fuel inlet and outlet ports. In combination the manifold, filter bowl and the filter element define a flow path in which fuel flows into the manifold through the fuel inlet port, through the filter element and out of the manifold via the fuel outlet port.

SUMMARY

According to an aspect of this disclosure there is provided a fuel filter comprising a manifold, a connector element, a filter bowl, a filter element, an inlet shutoff valve, an outlet shutoff valve, an inlet port, an inlet passage, an outlet port, an outlet passage and a relief valve in which the connector element is fixed to the manifold, and the filter bowl is reversibly fixed to the connector element, the filter bowl is adapted to reversibly receive the filter element and is so configured that when the filter element is located within the filter bowl and the filter bowl attached to the connection element the filter element divides the space defined by the connector element and filter bowl into an inlet filter chamber and an outlet filter chamber, the inlet port is incorporated in the manifold, and the inlet port and inlet filter chamber are in fluid communication via the inlet passage, the outlet port is incorporated in the manifold and the outlet port and outlet filter chamber are in fluid communication via the outlet passage, the inlet shutoff valve is biased by a biasing means into a closed configuration which prevents fuel flowing along the inlet passage when the filter bowl is not connected to the connector element, connection of the filter bowl to the connector element causes the inlet shutoff valve to be impelled into an open configuration which allows fuel to flow along the inlet passage, the outlet shutoff valve is biased by a biasing means into a closed configuration which prevents fuel flowing along the outlet passage when the filter bowl is not connected to the connection element, connection of the filter bowl to the connection element causes the outlet shutoff valve to be impelled into an open configuration which allows fuel to flow along the outlet passage, the relief valve is biased by a biasing means into a closed configuration in which fuel flowing between the inlet passage and outlet passage passes through the filter element, and movement of the relief valve into an open configuration allows fuel to flow between the inlet passage and the outlet passage via the relief valve without the fuel passing through the filter element, and the relief valve is caused to move into its open configuration when a predetermined fuel pressure is reached within the inlet passage and inlet chamber.

In some embodiments, the impelling of the inlet shutoff valve and the outlet shutoff valve into their open configuration commences after commencement of connection of the fuel filter bowl to the connector element and before the fuel filter bowl is fully connected to the connector element. That is the movement of the inlet and outlet shutoff valves toward their open configurations, and thus the partial opening of those valves, only commences once the connection of the fuel filter bowl to the connector element has begun. This ensures that any fuel released by the valves when they begin to open is caught in the fuel filter bowl and there is no risk of spillage.

For the purposes of the present disclosure, reference to "fully connected" when referencing the connection of the filter bowl to the connector element is to be understood to mean for connections such as screw threaded connections that the filter bowl is screwed to the connector element to the maximum extent possible.

An advantage of the fuel filter of the disclosure is that when the filter bowl is not attached to the connector element the inlet and outlet shutoff valves are both in their closed configurations with the result that fuel does not leak out of the connector element, manifold or fuel lines leading to and from the fuel inlet and fuel outlet ports respectively. This means that when servicing the fuel filter, for example changing the filter element, the fuel lines do not need to be detached from the manifold. It is further the case that when the filter bowl is being detached from the connector means the biasing means will cause the inlet and outlet shutoff valves to automatically move into their closed configurations. As such, the removal of the filter bowl is expected to leave the person removing the filter bowl with some fuel in the filter bowl which can then be safely stored or disposed of but there will be no fuel leaking from the manifold or connector element. These advantages have the result that servicing the fuel filter can be simple and swift and as such the costs associated with such a servicing can be minimised.

A further advantage of the fuel filter of the disclosure is that the connector element can be adapted to be attached to existing known configurations of fuel filter manifolds. This has the result that a fuel filter of the current disclosure can be fitted to an existing mechanism which incorporates a fuel filter, for example a gas turbine engine for us in an aircraft, without having to change the manifold.

A further advantage of the disclosure is that mechanically the fuel filter of the disclosure is relatively simple and can be made to a compact design. This can lead to a high degree of reliability and again reduced maintenance costs.

The filter bowl is configured to have the form of a bowl with an open mouth. In some embodiments of the above embodiments of the current disclosure the filter bowl is connected to the connector element via a screw thread adjacent to the open mouth of the filter bowl and a corresponding thread on the connector element. In some other embodiments the filter bowl is connected to the connector element via other mechanical engagement means where the act of connection of the filter bowl to the connector element means causes the filter bowl generally, and the base of the filter bowl specifically, to move closer to the connector element as connection occurs.

In some embodiments of the above embodiments the relief valve is caused to move into its open configuration when a predetermined fuel pressure is reached within the inlet passage and inlet chamber. This is advantageous because in normal operating conditions a fuel pump will pump fuel into the fuel filter and the fuel pressure within the inlet passage and inlet chamber will, among other factors, be a function of the pumping, the pressure drop across the filter element, and the related flow rate of fuel through the filter element. As the filter element traps material in the material of the filter the pressure drop across the filter element increases and the flow rate decreases until the filter element is sufficiently blocked that there is insufficient flow through the filter element. When the fuel within the inlet passage and inlet chamber reaches a predetermined pressure the pressure relief valve will be pushed open by the pressurised fuel. Fuel will then flow directly from the inlet passage or inlet chamber to the outlet chamber or outlet passage. This ensures that sufficient fuel exits the fuel filter via the fuel outlet port for continued operation of the mechanism in which the fuel filter of this disclosure is incorporated. Fuel will continue to flow through the relief valve until the fuel pressure within the inlet passage and inlet chamber drops below the predetermined pressure at which time the relief valve will revert to its closed configuration.

The maximum rate of flow of fuel through the fuel filter can be predetermined by designing the filter element and filter bowl to allow a maximum predetermined rate of fuel flow to occur. A non-limiting example of such a maximum desired fuel flow is 20 000 pph (2.520 Kg/s).

In some embodiments of the above embodiments of the current disclosure the inlet passage comprises a second inlet chamber in which one or both of the manifold and the connection means define the second inlet chamber and first and second inlet chamber apertures, in which the first inlet chamber aperture is a mouth of the portion of the inlet passage extending from the fuel inlet port, and at least one sliding seal means extends around the edge or inner face of the second inlet chamber aperture, the inlet shutoff valve comprises a longitudinally extending conduit element, the conduit element is configured to extend through the second inlet chamber aperture in a sliding engagement with the sliding seal means, the conduit element comprises a first closed end, a second end, one or more side walls, and a stop means, the one or more side walls of the conduit element extend between the first and second ends, at least one side wall of the conduit element defines at least one first fuel aperture passing through the side wall at a position spaced from the first end, the stop element of the conduit element extends laterally from the first end or from one or more side walls adjacent the first end, the stop element of the conduit element prevents the first end of the conduit element passing through the second inlet chamber aperture, each first fuel aperture of the conduit element is sufficiently longitudinally spaced from the first end of the conduit element that when the stop element abuts the face of the manifold or connection means that defines the second inlet chamber aperture each sliding seal means is in contact with a blank portion of the or each side wall, the blank portion of the or each side wall of the conduit element contains no first fuel apertures and lies longitudinally between the first end and the or each fuel aperture, the conduit element further comprises one or more second fuel apertures which are defined by one or more of the side walls of the conduit element, the one or more second fuel apertures of the conduit element are located longitudinally between the one or more first fuel apertures and the second end of the conduit, and the conduit element is dimensioned and configured so that when the filter bowl is fully attached to the connector element the second end of the conduit element abuts a part of the filter bowl, the first fuel apertures mouth into the second inlet chamber and the second fuel apertures mouth into the inlet filter chamber.

In this embodiment the conduit element acts as part of the inlet passage and movement of the conduit element between the configuration where the first fuel apertures mouth into the first inlet chamber (the open configuration of the inlet shutoff valve) and the configuration where the first fuel apertures are out of fluid communication with the first inlet chamber because the sliding seal means is between the aperture mouths and the first inlet chamber (the closed configuration of the inlet shutoff valve). The second end of the conduit element forms part of the inlet passage and may, in some embodiments, be located in the inlet filter chamber. The second end of the conduit element can be open, or the conduit element may be of other configurations that allow fuel that enters the conduit element via the first fuel apertures to exit the conduit element.

The advantage of this embodiment is that any fuel in the conduit element when the filter bowl is removed from the connector element may be expected to drain into the filter bowl. A further advantage of this embodiment is that the second inlet chamber may be of sufficient dimensions (in a direction substantially perpendicular to the longitudinal axis of the conduit element) that there is an unrestricted, non-turbulent, flow of the fuel through the second inlet chamber and into the first fuel apertures.

In some embodiments of the above embodiments of the current disclosure the conduit element further comprises one or more second fuel apertures which are defined by one or more of the side walls of the conduit element, the one or more second fuel apertures are located between the one or more first fuel apertures and the second end of the conduit element, and the conduit element is dimensioned and configured so that when the filter bowl is fully attached to the connector element the second end of the conduit element abuts a part of the filter bowl, the first fuel apertures of the conduit element mouth into the second inlet chamber and the second fuel apertures of the conduit element mouth into the inlet filter chamber.

In these embodiments the second fuel apertures are longitudinally spaced from the first fuel apertures and separated by a blank portion of the conduit element. Again this blank portion includes no apertures through the side wall or walls of the conduit element.

In some embodiments where the filter bowl is screwed onto the connector element, the second end of the conduit element connects with the portion of the filter bowl at or adjacent to the intersection of the filter bowl and the axis of the thread on the filter bowl that engages with the connector element.

An advantage of these embodiments is that the conduit element can be so dimensioned that the filter bowl does not make contact with the conduit element until the filter bowl is at least partially attached to the connector element. This avoids the inlet shutoff valve being opened too early leading to accidental spillage of fuel as the filter bowl is attached to the connector element.

In some embodiments of the above embodiment of the current disclosure the fuel filter further comprises an intermediate structure, in which the second end of the conduit element abuts a part of the filter bowl via the intermediate structure when the filter bowl is fully attached to the connector element, and the intermediate structure is configured and dimensioned so that the biasing means may displace the intermediate structures and move the conduit element into the closed configuration when the filter bowl is detached from the connection element.

In some other embodiments of the above embodiment of the current disclosure the fuel filter further comprises an intermediate structure, in which the second end of the conduit element abuts a part of the filter bowl via the intermediate structure when the filter bowl is fully attached to the connector element, and the intermediate structure is integral to or attached to the filter bowl.

In either of the above embodiments with an intermediate structure, the intermediate structure may also be so dimensioned, located and configured that it serves to locate and or retain the filter element in the filter bowl. The intermediate structure may be in sliding fit with a portion of the filter element so as to retain the filter element in the filter bowl.

In some embodiments of the above embodiments of the current disclosure the biasing means directly or indirectly biases the conduit element into the inlet shutoff valve closed configuration by biasing the stop means into a position where it prevents movement of the first end of the conduit element in the direction of the second end of the conduit element.

In some embodiments of the above embodiments of the current disclosure the outlet passage comprises a second outlet chamber, and one or more outlet intermediate structures in which one or both of the manifold and the connection means defines the second outlet chamber and a first and one or more second outlet chamber apertures, the first outlet chamber aperture is a mouth of the portion of the outlet passage extending from the fuel outlet port, each second outlet chamber aperture is in fluid communication with the outlet filter chamber, the outlet shutoff valve comprises an aperture closure element, the aperture closure element is configured to overlie all of the second outlet chamber apertures, the aperture closure element is movable between a closed configuration in which the aperture closure element closes all of the second outlet chamber apertures and an open configuration spaced from the second outlet chamber apertures, the aperture closure element is biased into the closed configuration by the biasing means, and each outlet intermediate structure is dimensioned and configured to contact a portion of the filter bowl when the filter bowl is fully attached to the connector element, the outlet intermediate structures impel the aperture closure element into its open configuration when the filter bowl is attached to the connector element, and the outlet intermediate structures allow the biasing means to displace those structures and move the aperture closure element into the closed configuration when the filter bowl is detached from the connection element.

A number of second outlet chamber apertures may be included in the fuel filter of the present disclosure so that there is no restriction on the flow of fuel out of the outlet filter chamber through the second chamber apertures.

In some embodiments of the above embodiments of the current disclosure the fuel filter comprises one or more outlet intermediate structures in which the or each outlet intermediate structures are dimensioned and configured to contact a portion of the filter bowl at least when the filter bowl is fully attached to the connector element, the outlet intermediate structures impel the aperture closure means into its open configuration when the filter bowl is fully attached to the connector element, and the one or more outlet intermediate structures allow the biasing means to displace the one or more outlet intermediate structures and move the aperture closure means into the closed configuration when the filter bowl is detached from the connection element.

An advantage of this embodiment of the present disclosure is that each second outlet chamber aperture is automatically closed as the filter bowl is moved away from the connector element.

An advantage of this embodiment is that the or each outlet intermediate structure can be so dimensioned that the filter bowl does not make contact with those structures until the filter bowl is at least partially attached to the connector element. This again avoids any accidental spillage of fuel as the filter bowl is attached to the connector element.

In some embodiments of the above embodiment of the current disclosure the or one of the outlet intermediate structures is the conduit element of the inlet shutoff valve. This has the advantage that the number of components in the fuel filter is minimised which leads to weight and cost savings. Further, such an arrangement also ensures that the inlet and outlet shutoff valves are opened and closed at substantially the same time as each other.

In some embodiments of the above embodiments of the current disclosure at least one of the first and biasing means is a compression spring.

In some embodiments of the above embodiments of the current disclosure the biasing means associated with the inlet and outlet shutoff valves are the same biasing means. This again has the advantage that the number of components in the filter is minimised which leads to weight and cost savings.

In some embodiments of the above embodiments of the current disclosure the relief valve comprises a means for adjusting the force with which the biasing means biases the relief valve into its closed configuration. This has the advantage that the relief valve may be calibrated to open at a specific predetermined fuel pressure in the filter inlet chamber and inlet filter passage. In some embodiments, the adjustment may be performed by the insertion or removal of shims between one end of the biasing means and whatever structure that end of the biasing means is bearing against.

In some embodiments of the above embodiments of the current disclosure the relief valve comprises a valve seat and a valve plug, the biasing means biases the valve plug against the valve seat (the closed configuration of the relief valve), and the valve plug may be impelled to move to a position spaced from the valve seat (the open configuration of the relief valve).

In some embodiments of the above embodiments of the current disclosure the valve plug has a frustoconical configuration and the valve seat is configured accordingly.

In some embodiments of the above embodiments of the current disclosure the valve seat defines at least part of a passage between the inlet filter chamber and the outlet filter chamber where the relief valve is downstream of the inlet shutoff valve and upstream of the outlet shutoff valve.

In this description references to upstream and downstream are with reference to the flow of fuel through the fuel filter from the fuel filter inlet port through the inlet passage, into the filter inlet chamber, through the filter element into the filter outlet chamber, and through the outlet passage to the outlet port.

In some embodiments of the above embodiments of the current disclosure the valve plug of the relief valve defines a plug aperture extending through the plug, the plug aperture has an orientation substantially parallel to the direction of movement of the valve plug between the open and closed configurations of the relief valve, the conduit element of the inlet shutoff valve passes through the plug aperture with a portion of the or each side wall of the conduit element between the first and second fuel apertures of the conduit element in a sliding sealing engagement with the valve plug. The sliding sealing engagement may be achieved using one or more sliding seal means each of which are retained in or adjacent to the plug aperture.

In some embodiments of the above embodiments of the current disclosure the conduit element of the inlet shutoff valve comprises a biasing means mounting element, and the biasing means extends between and bears upon the valve plug of the relief valve and the biasing means mounting of the conduit element. An advantage of this arrangement is again that that the number of components in the filter is minimised which leads to weight and cost savings.

In some embodiments of the above embodiment of the current disclosure the biasing means associated with the relief valve exerts less biasing force than the biasing means associated with the conduit element. An advantage of this arrangement is that the lower biasing force of the biasing means associated with the relief valve relative to the biasing means associated with the conduit element ensures that when the filter bowl is disconnected from the connector element the biasing means does not prevent the closure of the inlet shutoff valve.

In some embodiments of the above embodiments the relief valve of the fuel filter of the present disclosure is formed from stainless steel 4403, the or each biasing means from spring steel, the or each seal element from a suitable fluorocarbon, and the remaining parts from aluminium 6061 or aluminium T651. In other embodiments, other suitable materials may be used to form the parts of the fuel filter.

BRIEF DESCRIPTION OF THE DRAWINGS

The present invention will be further described and explained by way of example with reference to the accompanying drawings in which.

DETAILED DESCRIPTION

Figure 1:
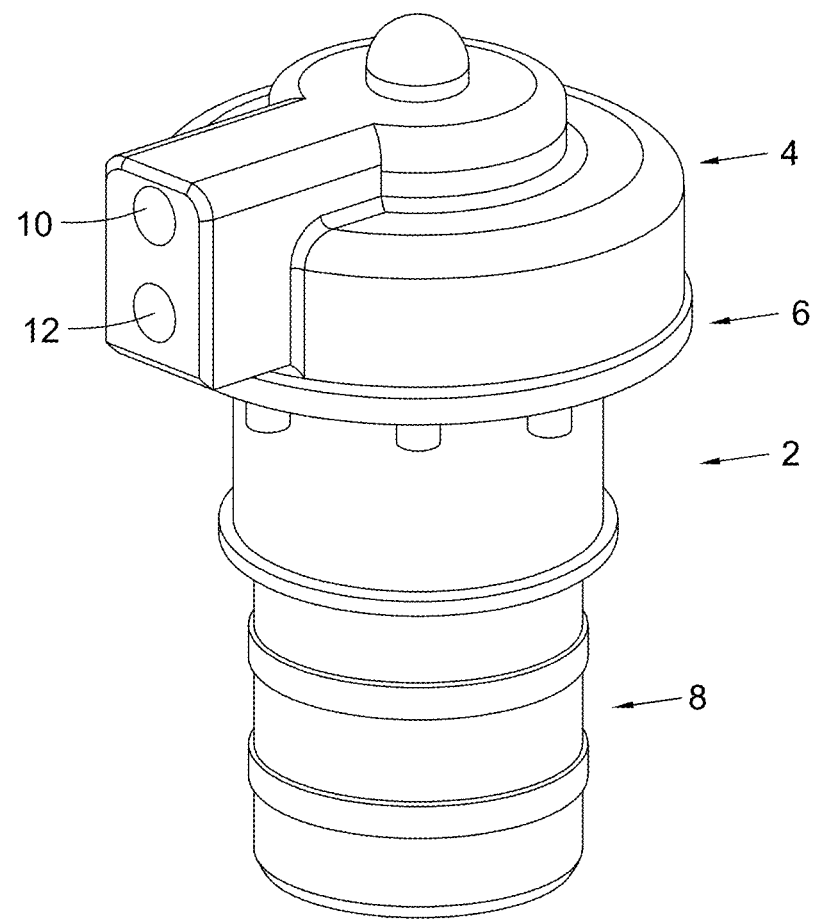
FIG. 1 shows a perspective view of an embodiment of a fuel filter of the present disclosure.
Figure 2:
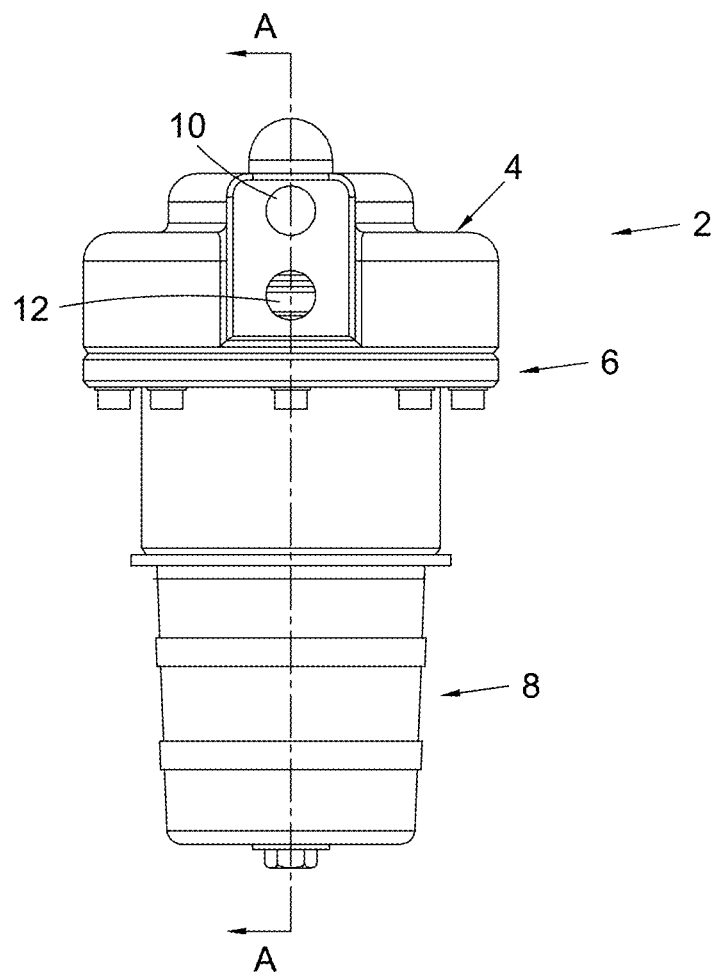
FIG. 2 shows a first side view of the fuel filter of FIG. 1.
Figure 3:
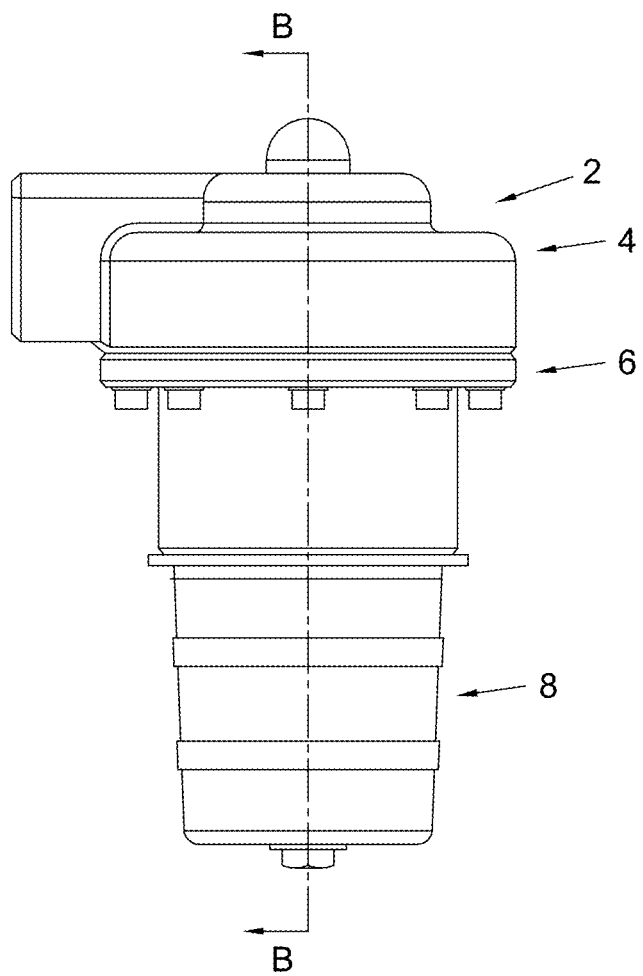
FIG. 3 shows a second side view of the fuel filter of FIG. 1.

With reference to FIGS. 1, 2 and 3, a fuel filter 2 is comprised of a manifold 4, to which is attach a connector element 6. Reversibly connected to the connector element 6 is a filter bowl 8.

The manifold 4 defines a fuel inlet port 10 and a fuel outlet port 12. The fuel inlet and outlet ports 10, 12 are provided with means (not shown) to engage with the ends of a fuel input line (not shown) and a fuel output line (not shown) respectively.

Figure 4:
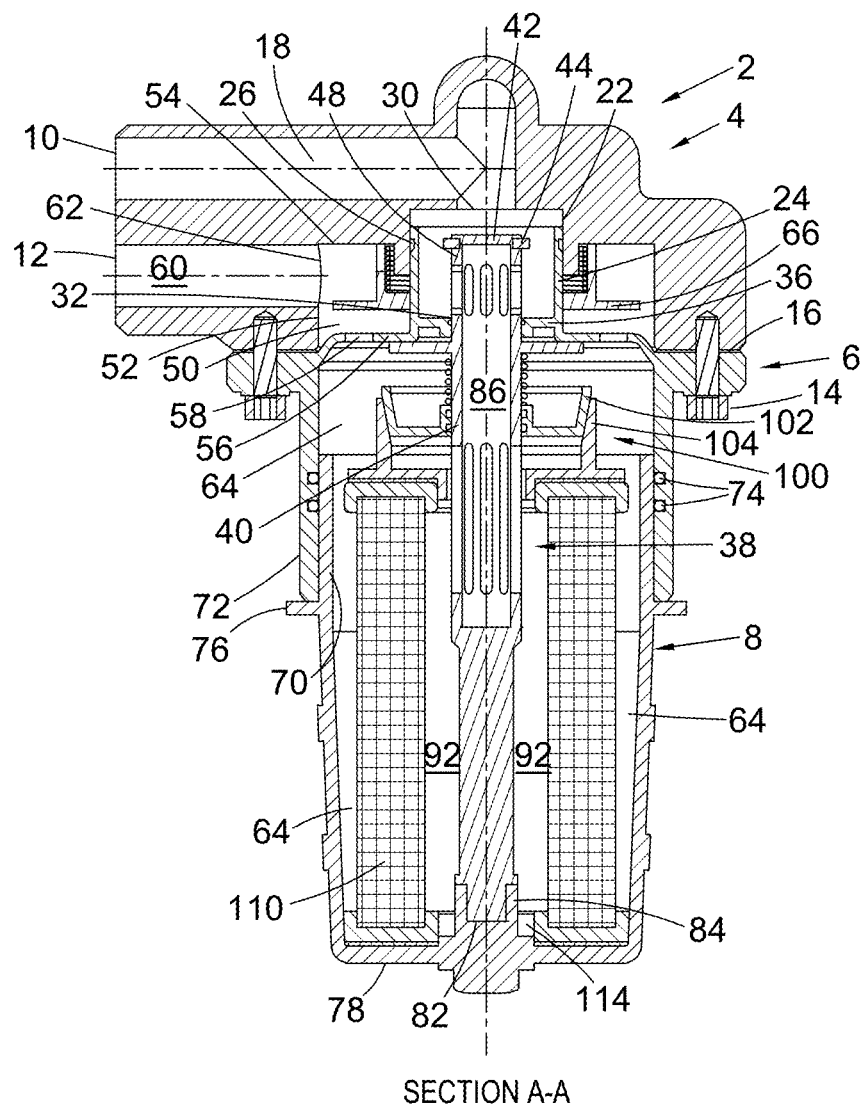
FIG. 4 shows a section A-A of the fuel filter of FIG. 2.
Figure 5:
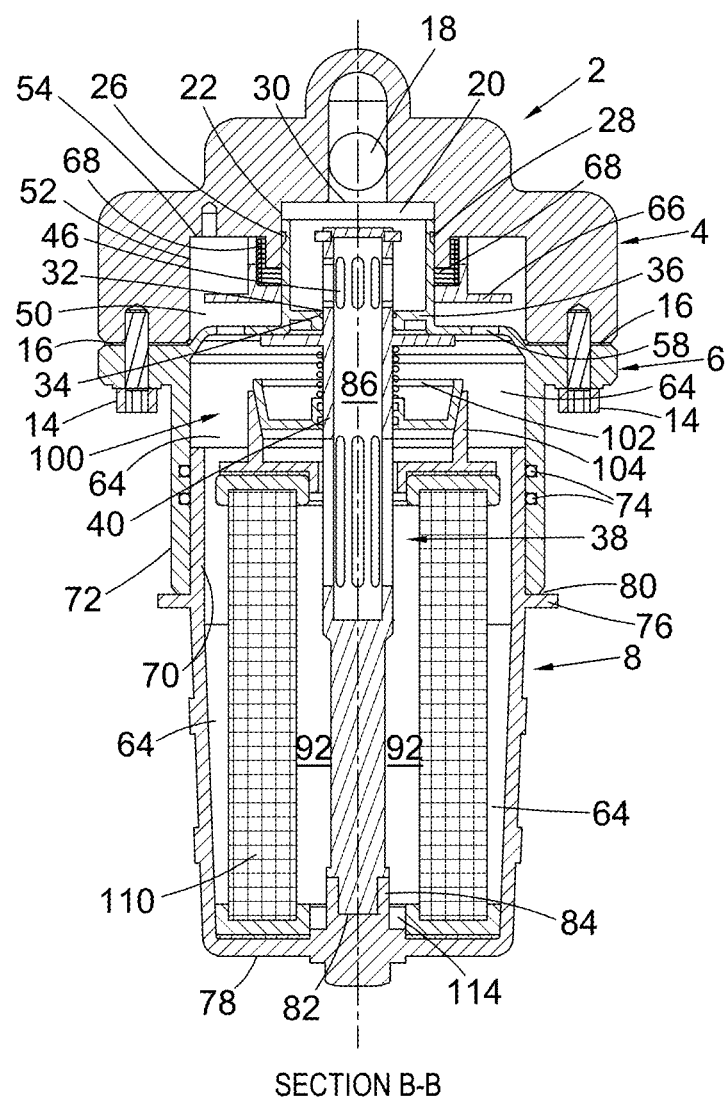
FIG. 5 shows a section B-B of the fuel filter of FIG. 3.

With reference to FIGS. 4 and 5, to enhance the clarity of these Figures, some elements described below and shown in these Figures are labelled in only one of the Figures.

Figure 6:
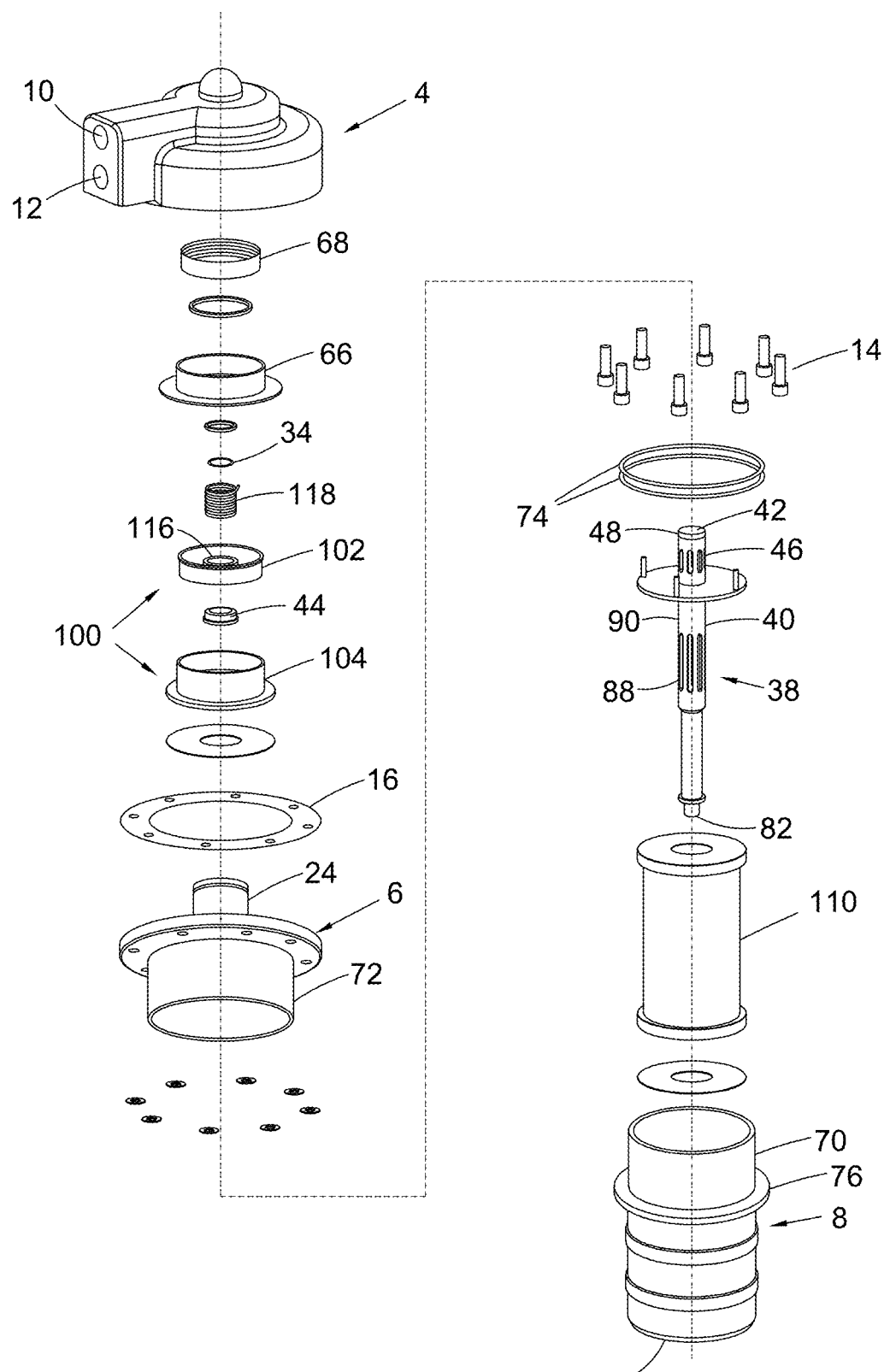
FIG. 6 shows an exploded view of the components of the fuel filter of FIG. 1.

With reference to FIGS. 4, 5 and 6, the connector element 6 is attached to the manifold 4 by a number of bolts 14 with an annular gasket 16 between the abutting faces of the connector element 6 and manifold 4.

The filter bowl 8 is adapted to reversibly engage with the connection means 6 via a helical screw thread (not shown) which is formed on the face of a portion of the radially outer face of the filter bowl element 70 and the radially inner face of connector element portion 72. The screw thread is dimensioned so that filter bowl element 70 may be screwed into the connector element portion 72 until the stop 76 on the filter bowl 8 abuts the edge 80 of the connector element portion 72. When the stop 76 on the filter bowl abuts the edge 80 of the connector element portion 72 the portion of the filter bowl element 70 furthest from the filter bowl base 78 is adjacent to the annular seals 74 and a fuel tight seal is formed between the connector element portion 72 and the filter bowl element 70. The annular seals 74, are retained in a pair of annular grooves (not labelled) in the inner face of connector element portion 72.

The annular seals 74 are o-rings and are formed of a fluorocarbon that is suitable for high temperatures and which has good chemical resistance, for example Viton (Registered trade mark) GLT which is available from DuPont Performance Elastomers. This is also the material used in connection with other annular seals, in particular o rings, used in this embodiment of a fuel filter according to the current embodiment of the present disclosure.

The filter bowl 8 is configured and dimensioned to substantially surround a known filter element 110. The filter element 110 is cylindrical and constructed to filter fuel that is flowing radially outwardly from an inlet filter chamber 92 in the inside of the cylinder of the filter element 110 to an outlet filter chamber 64 outside the filter element 110.

The base 78 of the filter bowl 8 is configured to engage with a first end of the filter element 110. The engagement is a push fit of the filter element 110 onto a spindle 114. The push fit is sufficiently tight that fuel will not flow through the joint between the filter element and the spindle 114.

The manifold 4 defines an inlet passage 18 which extends from the fuel inlet port 10 to a second inlet chamber 20. The second inlet chamber is defined in part by a recess face 22 in the manifold 4 and in part by a chamber element 24 and wall 36 of the connector element 6. Recess face 22, chamber element 24 and wall 36 define substantially cylindrical volumes and chamber element 24 is configured to be a sliding fit within the recess face 22. An annular seal 28, such as an o ring, is retained in an annular grove 26 in the radially outer surface of the chamber element 24 to form a fuel tight seal between the chamber element 24 and recess face 22.

The second inlet chamber 20 has a first inlet chamber aperture 30 and a second inlet aperture 32. The first inlet chamber aperture 30 is the mouth of the inlet passage 18 into the second inlet chamber 20 and passes through recess face 22 of the manifold 4. The second inlet aperture 32 is defined by the wall 36 of the connector element 6 and the face of wall 36 defining the aperture 32 includes an annular grove (not labelled) in which is retained an annular seal 34, such as an o ring.

The second inlet aperture 32 is circular in cross section (in the plane of the wall 36 of the connector element 4) and is dimensioned so that a cylindrical conduit element 38 with a side wall 40 can pass through the aperture 32 and the side wall 40 of the conduit element is in a sliding fit with the face of the wall 36 defining the aperture 32. The annular seal 34 forms a fuel tight seal between the face of wall 36 defining the aperture 32 and the side wall 40 of the conduit element when the side wall 40 has a blank portion that is a portion of the side wall 40 without apertures.

The conduit element 38 has a first closed end 42. Adjacent to the closed end 42 is an annular grove (unlabelled) in which a stop means 44 is retained.

Spaced from the longitudinal face of the stop means 44 furthest from the closed end 40 of the conduit element 38 are a plurality of first fuel apertures 46. The portion 48 of the side wall 40 between the stop means 44 and the first fuel apertures 46 is a blank portion of side wall that is, in a longitudinal direction, at least as long as the thickness of the wall 36 of the connector element 6. When the stop means 44 is in contact with the wall 36 the sliding seal means 34 is in contact with the portion 48 of the side wall 40 which seals the aperture 34 as a whole. As such, the conduit element 38 is, when the stop means 44 is in contact with the wall 36 of the contact element 6, the inlet shutoff valve in its closed configuration.

The conduit element 38 is of a length such that the second end 82 of the conduit element 38 abuts and sits within a cup 84 at the centre of the base 78 of the filter bowl 8. The abutment of second end 82 in the cup 84 has the advantage that when the filter bowl 8 is being screwed onto connection element 6 the cup 84 prevents any risk of the rotation of the filter bowl 8 causing the second end 82 of the conduit element 38 to move away from the centre of the filter bowl base 78 and potentially jam the conduit element 38 in a skewed position in aperture 32.

The conduit element is of such a length that when the second end 82 of the conduit element 38 is in the cup 84 sufficient of the conduit element 38 adjacent its first end 42 projects through the aperture 32 toward the manifold 4 that the first fuel apertures 46 entirely mouth into the second inlet chamber 20 as shown in FIGS. 4 and 5 and is the inlet shutoff valve in its open configuration. This allows fuel to flow from the second inlet chamber 20 through the first fuel apertures 46 and into the conduit 86 of the conduit element 38.

The side wall 40 of the conduit element 38 further defines a number of second fuel apertures 88 at a longitudinal position separated from the first fuel apertures 46 by a blank portion of the wall 90. The longitudinal dimension of the blank portion of the wall 90 is sufficient that some or all of the second fuel apertures 88 mouth into the filter inlet chamber 92 irrespective of the position of the conduit element 38 as it sits at the inlet shutoff valve open or closed configuration or at some position between those two configurations.

The manifold 4 and the connector element 6 define an annular second outlet chamber 50 between faces 52 and 54 of the manifold 4, the radially outer face of chamber element 24 and wall 56 of the connector element 6. The face 52 of the manifold 4 defines a first outlet chamber aperture 60 and the wall 56 of the connector element 6 defines a number of second outlet chamber apertures 58.

The first outlet chamber aperture 60 is the mouth of the outlet passage 62 which extends to the fuel outlet port 12. The second outlet chamber apertures 58 are in communication with the outlet filter chamber 64.

In a loose sliding fit with and extending around the chamber element 24 of the connector element 6 is a plate element 66. The plate element 66 is dimensioned so as to overlie all of the second outlet chamber apertures 58 when the plate element 66 is in contact with the wall 56 of the connector element 6. The face of the plate element 66 which contacts the wall 56 is proved with a flexible seal coating (not labelled) with the result that when the plate element 66 is impelled into contact with the wall 56 a fuel tight seal is created between the plate element 66 and the wall 56 and fuel cannot then pass through the second outlet chamber apertures 58. A biasing means 68 in the form of a compression helical spring is compressed between the face 54 of the manifold 4 and the plate element 66 and impels the plate element 66 into contact with the wall 56. When the plate element 66 is impelled into contact with the wall 56 and the second outlet chamber apertures 58 are sealed the plate element 66 is the outlet shutoff valve and is in the outlet shutoff valve closed configuration.

Figure 7:
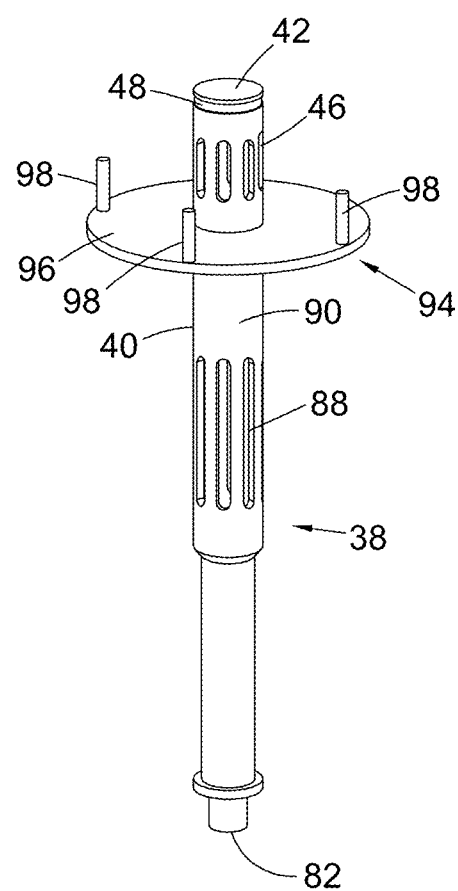
FIG. 7 shows an enlarged view of the conduit element of the fuel filter of FIG. 1.
Figure 8A:
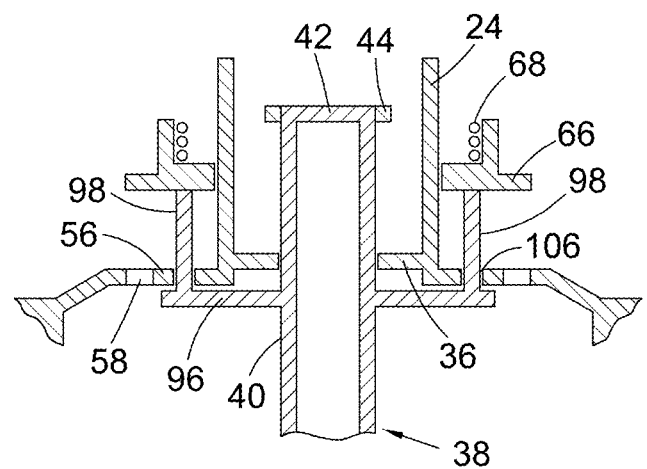
FIGS. 8a and 8b show a schematic view of the outlet shutoff valve in open and closed configurations.
Figure 8B:
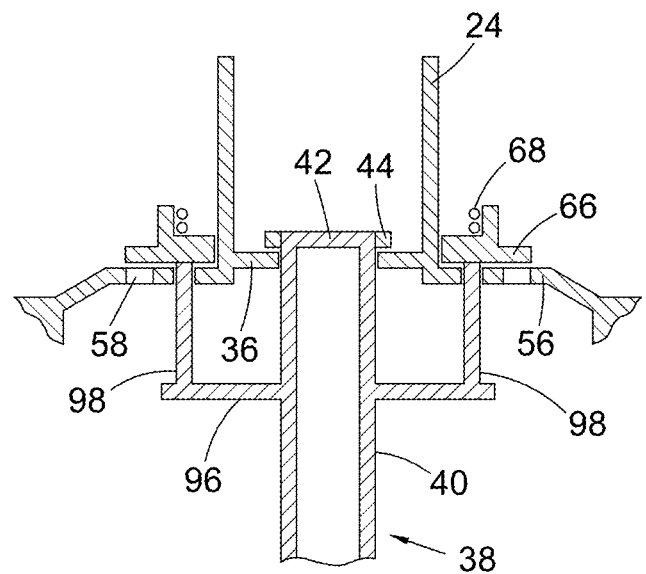

As shown in FIGS. 7, 8a and 8b, the conduit element 38 further comprises a biasing means mounting element 94 in the form of a plate 96 from which four pegs 98 (one of which is obscured in FIG. 7) are upstanding. The plate 96 extends radially outward from the side wall 40 and is longitudinally positioned on the conduit element 38 between the first fuel apertures 46 and the second fuel apertures 88 at a position which remains on the side of the wall 56 of the connector element 6 that faces the filter bowl 8 when it is fully attached to the connector element 6. The four pegs 98 are all upstanding from the face of plate 96 which faces the first end 42 of the conduit element 38, and are all spaced from the side wall 40 by a sufficient distance that when each peg 98 passes through a peg aperture 106 in the wall 56 of the connector element 6 the free ends of the pegs 98 abut the face of the plate element 66. The free ends of the pegs 98 are the ends remote from the plate 96.

The pegs 98 are upstanding from the plate 96 by a distance sufficient that, when (as illustrated in FIG. 8a) the conduit element 38 is in the inlet shutoff valve open configuration as a result of the interaction between the second end of the conduit element 38 and the base 78 of the filter bowl 8, the pegs 98 impel the plate element 66 into the outlet shutoff valve open configuration and compresses the biasing means 68.

When the second end of the conduit element 38 and the base 78 of the filter bowl 8 ceases to interact, the biasing means 68 expands and impels the plate element 66 into the outlet shutoff valve closed configuration. At the same time, the plate element 66 bears upon the ends of the pegs 98 and impels the conduit element 38 so that the first end 42 approaches the wall 36 and the inlet shutoff valve moves into the inlet shutoff valve closed configuration (as illustrated in FIG. 8b). This arrangement is advantageous because the biasing means can thus act directly on the outlet shutoff valve and indirectly on the inlet shutoff valve to close both valves at the same time when the filter bowl 8 is disconnected from the connector means 6, and the connection of the filter bowl 8 to the connector means 6 causes the filter bowl to act directly on the inlet shutoff valve and indirectly on the outlet shutoff valve to open both valves at the same time.

The fuel filter 2 further includes a frustoconical valve plug 102 and a valve seat 104 which is configured to form a seal when the valve plug 102 engages with the valve seat 104. The valve seat 104 is configured and dimensioned to reversibly engage with a second end of the filter element 110. The engagement between the valve seat 104 and the second end of the filter element 110 is a push fit with the push fit being sufficiently tight that fuel will not flow through the joint between the filter element 110 and the valve seat 104.

The valve plug 102 has a plug aperture 116 passing through it with that plug aperture 116 being co-axial with the axis of the frustoconical valve plug 102. The plug aperture 116 is so dimensioned that the conduit element 38 may slidingly move in an axial direction through the plug aperture 116. There is provided a sliding seal (not shown) such as an o ring on the face of the plug aperture 116 facing the conduit element 38 so that the plug aperture 116 is sealed against the flow of fuel through that aperture.

The valve plug 102 is impelled against the valve seat 104 by the biasing means 118. That biasing means 118 is a compression helical spring and it is compressed between the face of the plate 96 facing the second end of the conduit element 38 and the valve plug 102. The spring force of the biasing means 118 is chosen so that a predetermined fuel pressure in inlet filter chamber 92 will overcome that spring force and push the valve plug 102 away from the valve seat 104. This will let fuel flow from inlet filter chamber 92 directly into outlet filter chamber 64.

The spring force of the biasing means 118 is less than the spring force of the biasing means 68. This is required so that the biasing means 118 does not prevent the biasing means 68 impelling the inlet and outlet shutoff valves into their closed configurations as the filter bowl is detached from the connector 6.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the fuel filters disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A fuel filter comprising:
a manifold;
a connector element;
a filter bowl;
a filter element;
an inlet shutoff valve;
an outlet shutoff valve;
an inlet port;
an inlet passage;
an outlet port; an outlet passage; and
a relief valve;
wherein the connector element is fixed to the manifold, and the filter bowl is reversibly fixed to the connector element;
wherein the filter bowl is adapted to reversibly receive the filter element and is so configured that when the filter element is located within the filter bowl and the filter bowl attached to the connector element, the filter element divides a space defined by the connector element and filter bowl into an inlet filter chamber and an outlet filter chamber;
wherein the inlet port is incorporated in the manifold, and the inlet port and inlet filter chamber are in fluid communication via the inlet passage;
wherein the outlet port is incorporated in the manifold and the outlet port and outlet filter chamber are in fluid communication via the outlet passage;
wherein the inlet shutoff valve is located in the inlet passage and is biased by an inlet shutoff valve biasing means into a closed configuration which prevents fuel flowing along the inlet passage when the filter bowl is not connected to the connector element;
wherein connection of the filter bowl to the connector element causes the inlet shutoff valve to be impelled into an open configuration which allows fuel to flow along the inlet passage;
wherein the outlet shutoff valve is located in the outlet passage and is biased by an outlet shutoff valve biasing means into a closed configuration which prevents fuel flowing along the outlet passage when the filter bowl is not connected to the connector element;
wherein connection of the filter bowl to the connector element causes the outlet shutoff valve to be impelled into an open configuration which allows fuel to flow along the outlet passage;
wherein the relief valve is located between the inlet and outlet passages and is biased by a relief valve biasing means into a closed configuration in which fuel flowing between the inlet passage and outlet passage passes through the filter element, and movement of the relief valve, into an open configuration allows fuel to flow between the inlet passage and the outlet passage via the relief valve without the fuel passing through the filter element; and
wherein the relief valve is caused to move into its open configuration when a predetermined fuel pressure is reached within the inlet passage and inlet chamber, wherein:
the inlet passage comprises a second inlet chamber;
one or both of the manifold and the connector element define the second inlet chamber and first and second inlet chamber apertures, in which the first inlet chamber aperture is a mouth of a portion of the inlet passage extending from the fuel inlet port, and at least one sliding seal extends around an edge or an inner face of the second inlet chamber aperture;
the inlet shutoff valve comprises a longitudinally extending conduit element;
the conduit element is configured to extend through the second inlet chamber aperture in a sliding engagement with the sliding seal;
the conduit element comprises a first closed end, a second end, one or more side walls, and a stop means;
the one or more side walls of the conduit element extend between the first and second ends;
at least one side wall of the conduit element defines at least one first fuel aperture passing through the side wall at a position spaced from the first end;
a stop element of the conduit element extends laterally from the first end or from one or more side walls adjacent the first end;
the stop element of the conduit element prevents the first end of the conduit element passing through the second inlet chamber aperture;
each first fuel aperture of the conduit element is sufficiently longitudinally spaced from the first end of the conduit element that when the stop element abuts the face of the manifold or connection means that defines the second inlet chamber aperture each sliding seal is in contact with a blank portion of the or each side wall;
the blank portion of the or each side wall of the conduit element contains no first fuel apertures and lies longitudinally between the first end and the or each fuel aperture;
the conduit element further comprises one or more second fuel apertures which are defined by one or more of the side walls of the conduit element; and
the one or more second fuel apertures of the conduit element are located longitudinally between the one or more first fuel apertures and the second end of the conduit, and the conduit element is dimensioned and configured so that when the filter bowl is fully attached to the connector element the second end of the conduit element abuts a part of the filter bowl, the first fuel apertures mouth into the second inlet chamber and the second fuel apertures mouth into the inlet filter chamber.

2. The fuel filter according to claim 1, further comprising: an intermediate structure, in which the second end of the conduit element abuts a part of the filter bowl via the intermediate structure when the filter bowl is fully attached to the connector element, and the intermediate structure is configured and dimensioned so that the inlet shutoff valve biasing means may displace the intermediate structures and move the conduit element into the closed configuration when the filter bowl is detached from the connector element.

3. The fuel filter according to claim 1, wherein the outlet passage comprises a second outlet chamber, and one or more outlet intermediate structures;

and wherein:
one or both of the manifold and the connector element defines the second outlet chamber and a first and one or more second outlet chamber apertures;
the first outlet chamber aperture is a mouth of the portion of the outlet passage extending from the outlet port;
each second outlet chamber aperture is in fluid communication with the outlet filter chamber;
the outlet shutoff valve comprises an aperture closure element;
the aperture closure element is configured to overlie all of the second outlet chamber apertures;
the aperture closure element is movable between a closed configuration in which the aperture closure element closes all of the second outlet chamber apertures and an open configuration spaced from the second outlet chamber apertures;
the aperture closure element is biased into the closed configuration by the outlet shutoff valve biasing means;
each outlet intermediate structure is dimensioned and configured to contact a portion of the filter bowl when the filter bowl is fully attached to the connector element;
the outlet intermediate structures impel the aperture closure element into its open configuration when the filter bowl is attached to the connector element; and
the outlet intermediate structures allow the outlet shutoff valve biasing means to displace the outlet intermediate structures and move the aperture closure element into the closed configuration when the filter bowl is detached from the connector element.

4. The fuel filter according to claim 3, wherein the inlet shutoff valve comprises a longitudinally extending conduit element, and one of the outlet intermediate structures is the conduit element of the inlet shutoff valve.

5. The fuel filter according to claim 1, wherein at least one of the inlet and outlet shutoff valve biasing means and the relief valve biasing means is a compression spring.

6. The fuel filter according to claim 1, wherein the inlet and outlet shutoff valve biasing means are the same biasing means.

7. The fuel filter according to claim 1, wherein the relief valve comprises a valve seat and a valve plug, the relief valve biasing means biases the valve plug against the valve seat, and the valve plug moves between the open and closed configurations of the relief valve.

8. The fuel filter according to claim 7, wherein the valve plug has a frustoconical configuration.

9. The fuel filter according to claim 7, wherein the valve seat defines at least part of a passage between the inlet filter chamber and the outlet filter chamber where the relief valve is downstream of the inlet shutoff valve and upstream of the outlet shutoff valve.

10. The fuel filter according to claim 1, wherein:
the relief valve comprises a valve seat and a valve plug, the relief valve biasing means biases the valve plug against the valve seat, and the valve plug moves between the open and closed configurations of the relief valve; and
the valve plug defines a plug aperture extending through the plug, the plug aperture has an orientation substantially parallel to the direction of movement of the valve plug between the open and closed configurations of the relief valve, the conduit element of the inlet shutoff valve passes through the plug aperture with a portion of the conduit element between the first and second fuel apertures of the conduit element in a sliding sealing engagement with the valve plug.

11. The fuel filter according to claim 10, wherein the conduit element of the inlet shutoff valve comprises a biasing means mounting element, and the relief valve biasing means extends between the valve plug of the relief valve and the biasing means mounting element of the conduit element.

12. The fuel filter according to claim 11, wherein the relief valve biasing means exerts less spring force than one or both of the inlet shutoff valve and outlet shutoff valve biasing means.

13. A method of supplying fuel to a combustor of a gas turbine engine comprising:
passing the fuel through the fuel filter according to claim 1 prior to introduction of the fuel into the combustor.

* * * * *